United States Patent [19]

Axthammer et al.

[11] Patent Number: 4,484,670

[45] Date of Patent: Nov. 27, 1984

[54] VIBRATION DAMPER ARRANGEMENT PARTICULARLY FOR A SHOCK ABSORBER STRUT

[75] Inventors: Ludwig Axthammer, Hambach; Felix Wössner, Schweinfurt, both of Fed. Rep. of Germany

[73] Assignee: Fichtel and Sachs AG, Schweinfurt, Fed. Rep. of Germany

[21] Appl. No.: 345,698

[22] Filed: Feb. 4, 1982

[30] Foreign Application Priority Data

Feb. 13, 1981 [DE] Fed. Rep. of Germany ....... 3105170

[51] Int. Cl.³ .......................... F16F 9/54; B60G 15/06
[52] U.S. Cl. ................................ 18/322.191; 29/516; 29/517
[58] Field of Search ...................... 188/322.19, 322.21, 188/322.11, 321.11; 267/33, 34, 8 R, 64.15, 60, 61 R, 64.26, 66–68, 118, 113, 170, 166, 178, 179; 280/668; 29/505, 508, 515, 521, 516, 517

[56] References Cited

U.S. PATENT DOCUMENTS

| 3,068,563 | 12/1962 | Reverman | 29/516 |
| 3,892,397 | 7/1975 | Nicholls et al. | 267/8 R |
| 3,917,308 | 11/1975 | Schulz | 267/34 X |
| 4,274,654 | 6/1981 | Travaglio | 280/668 |
| 4,321,988 | 3/1982 | Bich | 188/322.11 |
| 4,330,924 | 5/1982 | Kushner et al. | 29/516 X |
| 4,392,294 | 7/1983 | Campbell | 29/516 X |

FOREIGN PATENT DOCUMENTS

| 23967 | 2/1981 | European Pat. Off. . |
| 2938927 | 9/1979 | Fed. Rep. of Germany . |
| 1493130 | 8/1967 | France . |
| 2215558 | 8/1974 | France . |
| 2213434 | 8/1974 | France . |
| 2403492 | 4/1979 | France . |
| 2432948 | 3/1980 | France . |
| 2437310 | 4/1980 | France . |
| 2468035 | 4/1981 | France . |
| 1031650 | 6/1966 | United Kingdom . |
| 1060560 | 3/1967 | United Kingdom . |
| 1296722 | 11/1972 | United Kingdom . |
| 1393939 | 5/1975 | United Kingdom . |
| 1428413 | 3/1976 | United Kingdom . |
| 1480303 | 7/1977 | United Kingdom . |
| 1503015 | 3/1978 | United Kingdom . |
| 2093157 | 8/1982 | United Kingdom ........... 188/322 H |

*Primary Examiner*—Douglas C. Butler
*Attorney, Agent, or Firm*—Toren, McGeady and Stanger

[57] ABSTRACT

A vibration damper including a vibration damper mechanism composed of a piston-and-cylinder construction located within a pipe jacket wherein fitting elements such as a spring retainer and a steering knuckle support are attached on the pipe jacket by a mounting construction in accordance with the invention. The fitting elements are located on the pipe jacket at their corresponding positions and they are deformed in such a way that radially inwardly directed projections of the fitting elements are shaped in conformity with corresponding indentations of the pipe jacket in order to provide a reliable locking connection between the fitting elements and the pipe jacket in a simple and economical manner.

18 Claims, 9 Drawing Figures

VIBRATION DAMPER ARRANGEMENT PARTICULARLY FOR A SHOCK ABSORBER STRUT

The present invention relates generally to an arrangement for a vibration damper and, in particular, a vibration damper which is used as a shock absorbing strut. A device of the type to which the present invention relates comprises a vibration damping mechanism of the piston-and-cylinder type having a pipe jacket with at least one fitting element extending around the pipe jacket and affixed positively thereto by means of at least one radial projection.

Means are known in the prior art for fastening such fitting elements and such means may include, for example, spring retainer fasteners and steering knuckle fasteners which include welding or soldering of parts to the pipe jacket. These fastening procedures tend to be costly and require expensive safety checks on structural components thereof so that faults may be avoided in the connecting elements and so that adequate tightness to ensure sufficient mechanical stability may be achieved at the fastening location. Additionally, welding requires that the pipe jacket be formed with a minimal wall thickness or strength.

A vibration damper of the type described above is known from German Offenlegungsschrift No. 29 38 927. In this mechanism, the fitting element is furnished with recesses into which radially outwardly directed projections of the pipe jacket engage. In order to ensure a support which is secure against shifting, these projections and recesses must be manufactured with great precision. In fastening the fitting element onto the pipe jacket by subsequently widening the projection and pressing it out of the pipe jacket, an increased danger of cracking arises especially in the case of pipe jackets formed by drawing metal. Such cracking is usually the result of powerful local expansion which occurs in the pipe jacket in the circumferential direction. Experience has shown that drawn pipes tend to crack chiefly when deformation and expansion occur in the circumferential direction.

The object of the present invention is to avoid the disadvantages of prior art arrangements and to create a fault-free firm connection of the fitting elements with the pipe jacket while at the same time enabling this connection to be produced simply and economically with a high degree of operational safety.

SUMMARY OF THE INVENTION

Briefly, the present invention may be described as a vibration damper assembly comprising a vibration damping mechanism formed with a piston-and-cylinder construction and including a pipe jacket, at least one fitting element embracing said pipe jacket and affixed thereto by at least one radial projection, said fitting element including at least one said radial projection which is directed radially inwardly and which extends partially circumferentially thereof, with said pipe jacket being formed with at least one indentation corresponding with said at least one projection, said projection engaging into said corresponding indentation of said pipe jacket.

In accordance with the invention, the fitting element is thus formed with at least one projection which is directed radially inwardly and which follows a course over a partial area of the circumference thereof. This projection engages into a corresponding indentation of the pipe jacket. Placing of the projection or the indentation can be accomplished in a simple manner in that the projection and the indentation are manufactured simultaneously by a suitable reshaping, preferably stamping of the fitting element arranged on the pipe jacket. A secure connection free of play between the structural components may thus be obtained. In the process of the invention, the reshaping occurs from the outside inwardly and the structural component which is less liable to crack, that is the exteriorly located fitting element, will have the stronger reshaping forces applied thereto particularly sharper stamp edges because it will abut directly against the stamping tool. The stamping contours of the pipe jacket situated radially inwardly, on the other hand, will be less sharp so that cracks in the pipe jacket in this region need not be a problem.

Furthermore, in order to avoid to a great extent in the direction of the circumference of the material expansion of the pipe jacket in the area of the indentation, it is proposed in accordance with the invention that the deformed region of the pipe jacket which is shaped with the indentation be provided in the circumferential direction with a contour length that corresponds to the length of the arc shaped contour of this region before the deformation has been effected.

In order to avoid unilateral mechanical tensions of the pipe jacket in the axial direction, it is advantageous to arrange on the fitting element several projections which are evenly distributed over the circumference thereof and which are shaped by impressions and directed radially inwardly and to arrange corresponding indentations on the pipe jacket.

In accordance with the invention, the projections on the fitting element are arranged in the area of at least one edge of the fitting element while at the same time each projection preferably extends forward radially inwardly in the direction of the respective edge of the fitting element preferably with its projection end which is closest the edge of the fitting element. Thus, the projection may brace itself against an approximately radially extending contact surface of the indentation. Such projections are easy to shape and will only create a slight lessening of strength in the fitting element. Thus, the projections are constructed approximately in the shape of barbs and will engage in a positive manner into the correspondingly shaped indentations of the pipe jacket. Consequently, this type of connection will be mechanically stable especially when considering the forces which will tend to move the fitting element relative to the pipe jacket in a direction away from the edge of the fitting element which is remote from the projections of the proximate edge of the fitting element. It is therefore advantageous if, as suggested in accordance with the invention, the projections be directed inwardly and be arranged in the area of the forward circumferential edge of the fitting element, i.e., forwardly in relation to the pipe jacket in the direction of the main stress on the fitting element. The common reshaping of the fitting element and the pipe jacket results in both parts having a connection which is free of play in the axial direction and additionally in securing the fitting element, particulary one shaped by a spring retainer, against turning. This type of fastening is especially suitable in those instances wherein the direction of force is constant.

For uses wherein the direction of the force may be variable, it is proposed in accordance with a further aspect of the invention that the pipe jacket have a preformed shoulder for contact with the fitting element. The result of this is that on the one hand the fitting element abuts against the shoulder and on the other hand the projections which are inwardly directed are arranged in the area of the circumferential edge of the fitting element which is remote from the contact area, that is, the lower circumferential edge of the fitting element.

Also, however, a radially inwardly projecting slide-in stop for the pipe jacket can be provided on the fitting element.

When the pipe jacket is designed as a continuously cylindrical component, the inwardly directed projections of the fitting element and the corresponding indentations of the pipe jacket may, in accordance with a further embodiment of the invention, be arranged in the area of both circumferential edges of the fitting element.

However, the inwardly directed projections of the fitting element and the corresponding indentations of the pipe jacket may also be arranged at a distance from both circumferential edges of the fitting element.

In order to conserve material and reduce waste, the fitting element in accordance with another embodiment of the invention is furnished with at least one recess in the region of the central portion of its length parallel to the axis of the vibration damper. The recess in the fitting element thereby preferably passes over a large part of the circumference in order to form a pair of annular brackets. The fitting element is fastened to the pipe jacket in an advantageous manner by the radially directed projections arranged on the edges of the recess.

The fitting element may be formed by a spring retainer which embraces the pipe jacket with an annular attachment.

The fitting element may be constructed in one piece with a steering knuckle. Alternatively, the fitting element may also be constructed as a pipe-clamp type of connecting element between the pipe jacket and a separate steering knuckle.

In a preferred embodiment of the invention, the pipe jacket is formed on the outer pipe of a dual pipe shock absorber.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

The shock absorber strut to which the present invention relates is a so-called McPherson strut which may be fastened on a motor vehicle body by means of a piston rod thereof and which includes a pipe jacket which is connected with a wheel of the motor vehicle by means of a steering knuckle. The spring action is undertaken by a spiral spring which is braced on one side of the strut upon a spring retainer and on the other side against the body of the motor vehicle.

Figure 1:
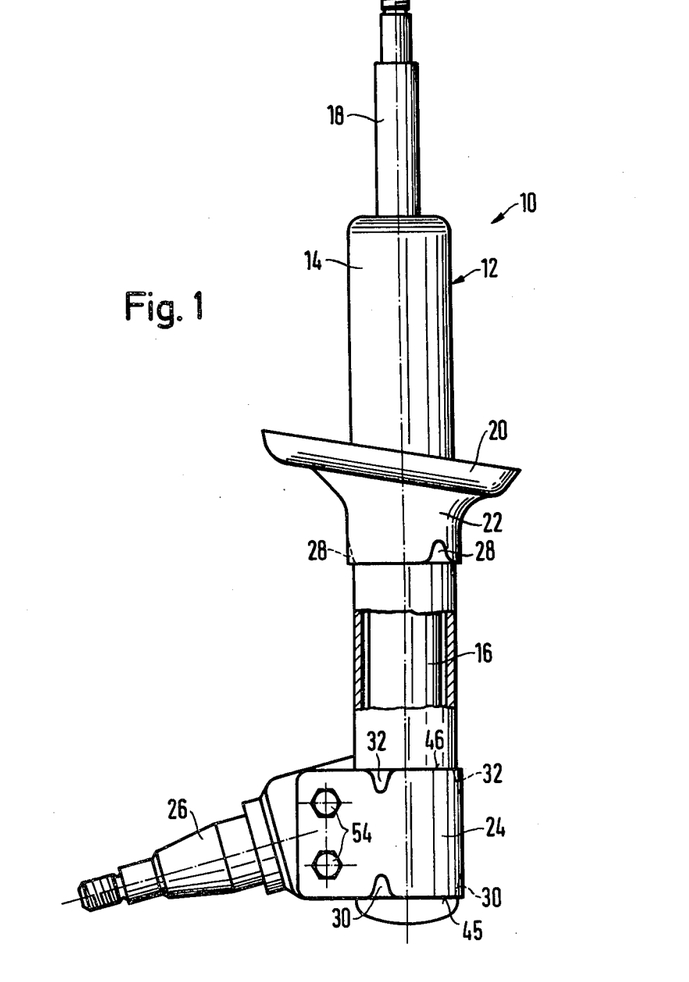
FIG. 1 is a view partially in section of a shock absorber strut in accordance with the invention.

Shown in FIG. 1 is a shock absorber strut 10 of the type which is composed of a dual pipe vibration damper mechanism 12 furnished with fitting elements. The damper 12 includes an outer pipe which is designated as a container pipe or pipe jacket 14 and which includes an inner pipe 16 concentric therewith designated as the damper cylinder. A piston rod 18 projects upwardly out of the damper cylinder 16 and is guided and sealed off at the upper end of the pipe jacket 14. The construction of such a dual pipe vibration damper is generally known and thus it is considered unnecessary to provide more detailed explanation of the general arrangement thereof.

One of the fitting elements mounted on the vibration damper 12 is in the form of a spring retainer 20 which includes an annular attachment 22, the inner diameter of which is adapted to the outer diameter of the pipe jacket 14. A further fitting element is in the form of a steering knuckle support 24 which effects connection between the vibration damper 12 and a steering knuckle 26. The inner diameter of the steering knuckle support 24 corresponds, in turn, to the outer diameter of the pipe jacket 14. Fastening of the spring retainer 20 is effected by means of a common reshaping of the annular attachment 22 and of the pipe jacket 14. For this purpose, radially inwardly directed projections 28 are pressed in at the end of the annular attachment 22 which is more remote from the free end of the piston rod, i.e., the lower edge of the annular attachment 22 as shown in FIG. 1. The projections 28, in turn, each produce a corresponding indentation in the pipe jacket 14. This common inwardly directed reshaping of the fitting element and of the pipe jacket 14 ensures a connection of these parts which is secure and free from play.

A similar arrangement is provided with regard to the other fitting element, that is, the steering knuckle support 24 which receives the steering knuckle 26. Here again, radially inwardly directed projections 30 and 32 are provided, together with corresponding indentations which are produced by a common shaping of the steering knuckle support 24 and of the pipe jacket 14.

Figure 2:
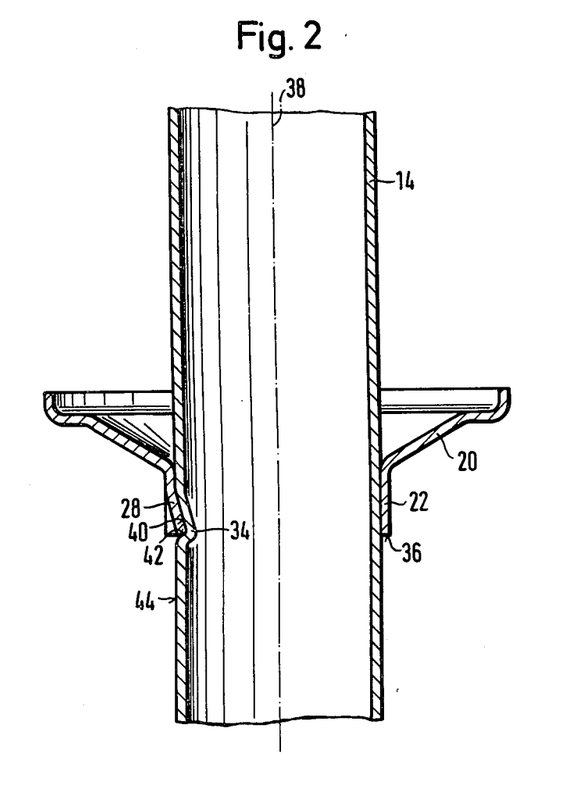
FIG. 2 is a sectional view showing the fastening arrangement of a spring retainer on the pipe jacket of the strut shown in FIG. 1 depicted on an enlarged scale.

FIG. 2 shows on an enlarged scale the fastening arrangement of the spring retainer 20 on the pipe jacket 14. The spring retainer 20 with its annular attachment member 22 is pressed onto the pipe jacket 14 into a desired position whereupon by a common shaping or stamping of the annular attachment 22 together with the pipe jacket 14, the interconnection of these two parts may be established. At the same time, by inward pressing of the inwardly directed projections 28, recesses 34 in the pipe jacket 14 will be formed. The greatest degree of deformation or reshaping of the projections 28 or of the indentation 34 occurs in the region of the lower circumferential edge 36 of the fitting element. The indentation 34 accordingly is formed with a contact surface 40 which extends in an inclined relationship relative to the axis 38 of the vibration damper.

In FIG. 2, this contact surface 40 passes in the upward direction into the undeformed cylindrical outer circumferential surface 44 of the pipe jacket 14 and in the downward direction it extends toward the axis 36 and is finally continued or joined by a second contact surface 42 which extends approximately radially outwardly or at least substantially with a stronger inclined relationship relative to the axis 38 passing then in turn into the cylindrical outer circumferential surface 44 of the pipe jacket 14.

In the sectional view shown in FIG. 2, the projection 28 forms a sheet metal fin or tongue which with its inner lateral surface abuts against the first contact surface 40 and which with its lower edge braces against the contact surface 42. Since the contact surface 42 is formed with a sharply inclined radial course, the result is that the connection between the spring retainer 20 and the pipe jacket 14 provides a high degree of mechanical stability with regard to forces which will tend to shift the spring retainer 20 downwardly on the pipe jacket 14. Such forces will be generated by the spiral spring (not shown) which is braced between the upper side of the spring retainer 20 and the motor vehicle. Hence, the type of fastening shown in FIG. 2 is especially suitable for fitting those parts which are under the influence of a constantly downwardly directed force as is the case with a spring retainer of a shock absorber strut.

Figure 3:
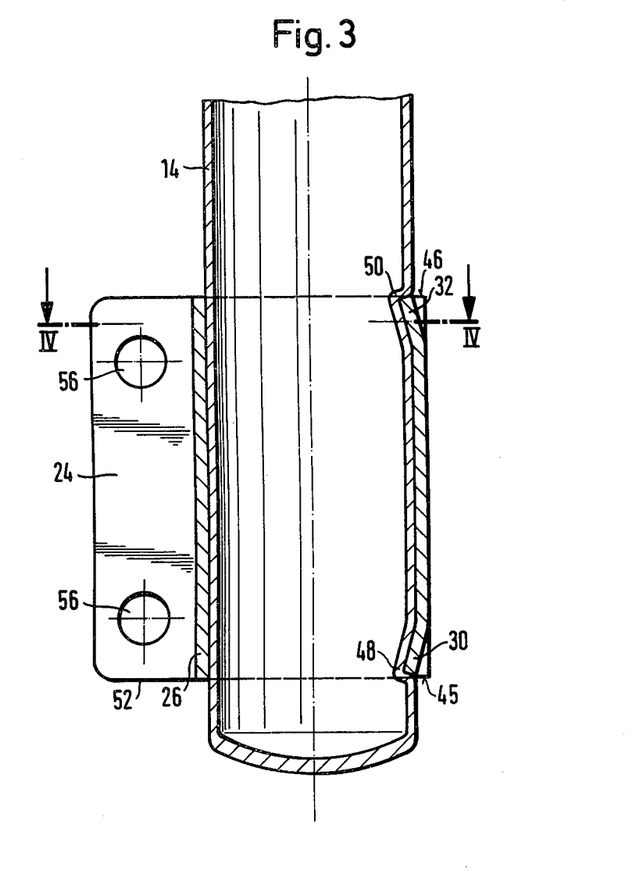
FIG. 3 is a sectional view on an enlarged scale of an arrangement for fastening a steering knuckle support on the pipe jacket.
Figure 4:
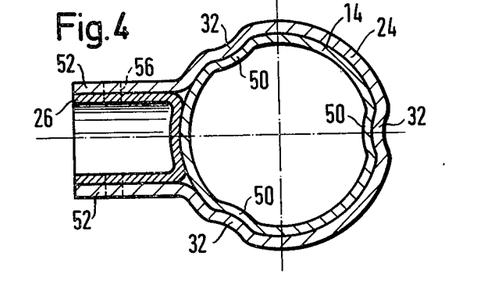
FIG. 4 is a horizontal sectional view of the arrangement according to FIG. 3 taken along the line IV—IV.

The fastening of the other fitting element, i.e., the steering knuckle support 24, on the pipe jacket 14 is effected by means which include, in the areas of the lower circumferential edge 45 of FIG. 3 of the steering knuckle support 24 as well as at its upper circumferential edge 46, projections 30 and 32 together with corresponding indentations 48 and 50 in the pipe jacket. The projections 30, 32 and the corresponding indentations 48, 50 are formed by a common shaping process inwardly from the outer side of the device. As will be seen in the cross-sectional view of FIG. 4, three projections 32 are provided on the steering knuckle support 24, the projections being evenly circumferentially distributed on the support 24. Corresponding indentations 50 on the pipe jacket 14 are also provided along the upper circumferential edge 46 of the fitting member and, correspondingly, on the lower circumferential edge 45 of the fitting member. By these means, a connection between both parts may be obtained which is free from play and which is secure against relative rotation. It is thus ensured that, even when the direction of force may be variable, the fitting element or steering knuckle support 24 will not loosen, shift, or turn. In FIG. 4 it will be seen that the steering knuckle support 24 embraces the pipe jacket 14 along a part of the circumference thereof in the manner of a pipe clamp and that the support 24 has a pair of parallel bracket ends 52 arranged spaced from each other which serve for effecting connection with the steering knuckle 26. For this purpose, the two bracket ends 52 embrace the steering knuckle 26 which reaches to the pipe jacket 14 and they are connected to the steering knuckle 26 by means of screw connections 54 best seen in FIG. 1. These screw connections 54 extend through the fastening holes 56 in the bracket ends 52 with the fastening holes 56 being best seen in FIG. 3.

Figure 5:
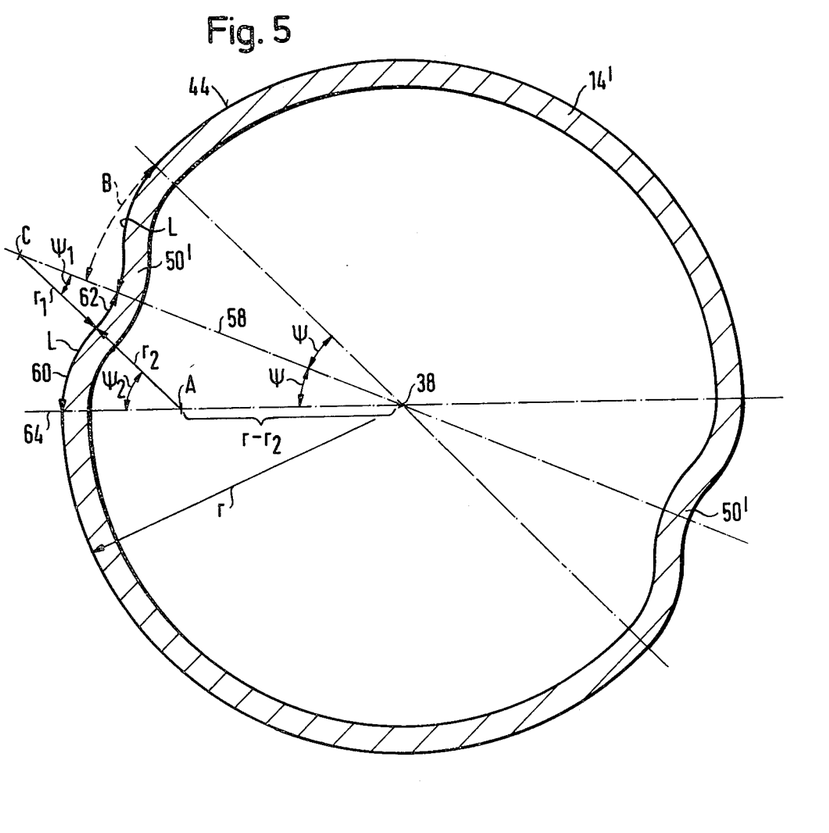
FIG. 5 is a horizontal sectional view of the pipe jacket showing deformation parameters of the indentations therein.

The formation and arrangement of the indentations in the pipe jacket will be described in greater detail with reference to FIG. 5. In order to simplify the disclosure, the pipe jacket 14' shown in FIG. 5 is formed with only two recesses 50' which are located opposite each other and which are generally formed with the same configuration. Both the recesses 50' are symmetrically arranged with relation to a straight radial line 58 which intersects perpendicularly the axis 38 of the vibration damper. The indentations 50' have in the circumferential direction a contour length 2L which corresponds with the length 2B of the corresponding arc of the circle formed by the pipe jacket 14' prior to deformation thereof to form the indentation. Indentations 50' made from this viewpoint largely avoid transverse expansion of the pipe jacket 14', i.e., expansion in the direction of the circumference thereof.

As indicated in FIG. 5, the indentations 50' shaped as shown are each composed of a first deformation sector 60 which is adjoined by a second deformation sector 62. The deformation sectors 60 and 62 extend between an undeformed circumferential part of the pipe jacket 14' beginning at the point of intersection of the circumference of the jacket 14' with an outer circumferential diameter r and extending up to the point of intersection with the radial line 58. The half of the indentation 50' which lies on the opposite side of the radial line 58 is formed with a symmetrical mirror image construction, with the radial line 58 defining the mirror image or reflection plane therebetween.

The first deformation sector 60 is formed with an inwardly directed cylindrical curvature which has as its center of curvature a point A lying within the pipe jacket 14' with the radius of curvature of the outer circumferential surface of the sector 60 being indicated as $r_2$.

The sector 60 thus forms a circular sector or an inwardly directed concave cylindrical sector extending through a sector angle $\psi_2$. The second sector 62, on the other hand, has an opposite curvature and the center of curvature of the sector 60 is labeled as point C which lies on the exterior of the pipe jacket along the straight line 58. The radius of the outer circumferential surface 44 of the pipe jacket 14' in sector 62 is indicated as $r_1$ shown in FIG. 5. The sector angle through which the sector 62 extends is marked as $\psi_1$. The center A lies on a straight line 64 which intersects the axis 38 at right angles and, in so doing, passes through the intersection between the axis 38 and the radial line 58. The lines 58 and 64 enclose an angle $\psi$ with the angle $\psi$ indicating the angular extent of the indentation 50'.

The length B of the arc through which the angle $\psi$ extends with a radius r, which is the perimeter length of the outer surface of the undeformed pipe jacket, is represented by the following equation:

$$B = r \cdot \frac{\pi}{180} \cdot \psi. \qquad (I)$$

The contour length of the sectors 60 and 62 of the deformed pipe jacket outer wall is, on the other hand, represented by the following equation:

$$L = \frac{\pi}{180}(r_2\psi_2 + r_1\psi_1). \quad \text{(II)}$$

The relationship B=L is met when $\psi=\psi_1$ and $\psi_2 = 2\psi_1 = 2\psi$ and when $r - r_2 = r_1 + r_2$.

Figure 6:
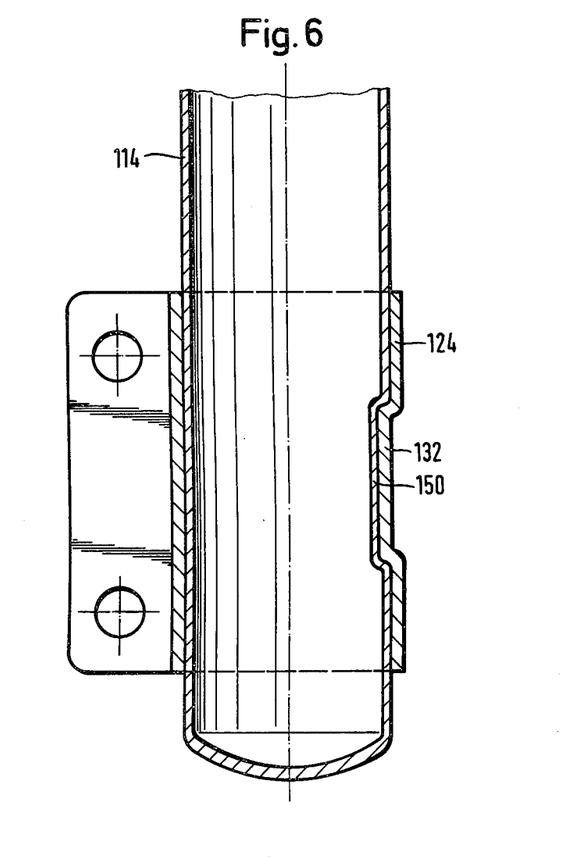
FIG. 6 is a lateral sectional view of a second embodiment of the invention wherein projections are arranged at the longitudinal mid-portion of a steering knuckle support.

FIG. 6 depicts a second embodiment of the invention wherein the pipe jacket 114 is, in turn, furnished with a steering knuckle support for connection with a steering knuckle (not shown). In this embodiment, projections 132 and corresponding indentations 150 are formed in the region of the middle of the length of the cylindrical part of the steering knuckle support 124 by means of a common shaping operation of the steering knuckle support 124 and of the pipe jacket 114.

Figure 7:
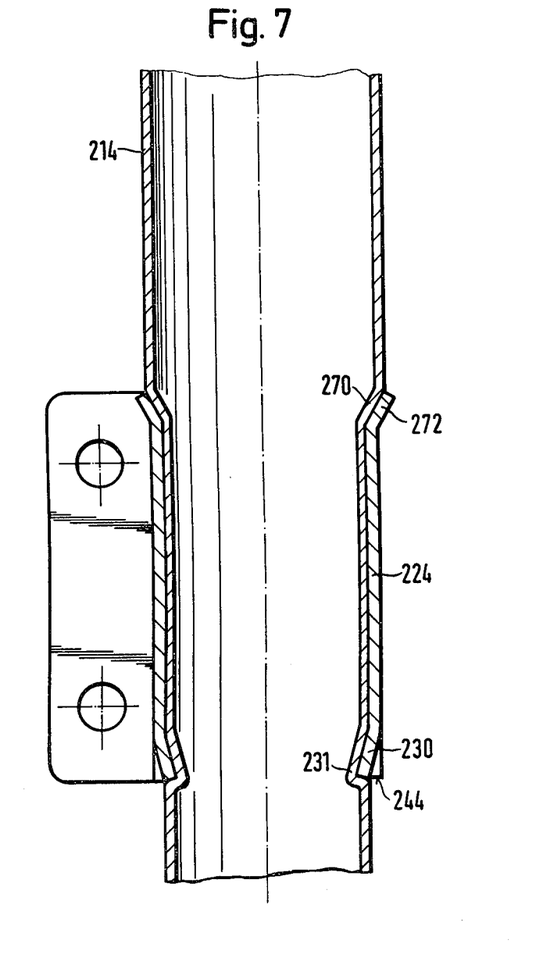
FIG. 7 is a lateral sectional view of a further embodiment wherein the pipe jacket is furnished with a shoulder.

Another type of fastening arrangement is shown in FIG. 7 wherein the pipe jacket 214 is reduced in diameter thereby forming a shoulder 270. The steering knuckle support 224 is furnished with a contact flange 272 adapted to the shoulder 270 and is pressed against the shoulder 270 together with the contact flange 272. Following this, the radially inwardly directed projections 230 in the steering knuckle support 224 are established at the same time with formation of the corresponding indentations 231 in the container pipe 214 in the region of the lower circumferential edge 244 of the fitting element.

Figure 8:
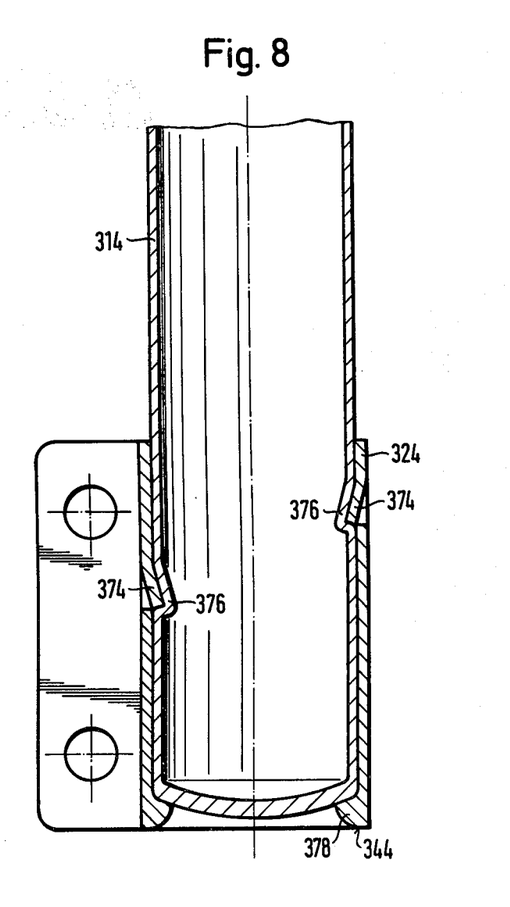
FIG. 8 is a lateral sectional view of a further embodiment wherein projections are arranged at the upper and lower circumferential edges of a steering knuckle support.

In the embodiment shown in FIG. 8, a steering knuckle support 324 is fastened on a pipe jacket 314 by means which include projections 374 arranged between the upper and lower circumferential edge of the fitting element which are formed by being reshaped in common with corresponding indentations 376. The projections 374 and the indentations 376 are in turn so constructed that the radially inwardly directed portion on each projection or each indentation increases downwardly from above and consequently opposes an increased resistance to the removal of the pipe jacket 314. Further fastening members for the steering knuckle support 324 on the pipe jacket 314 are formed in the region of the lower circumferential edge 344 of the fitting element. These further fastening members comprise several impressions 378 of the support 324 distributed over the circumference thereof and abutting against the base of the pipe jacket 314 thereby forming a stop for the pipe jacket 314 in the steering knuckle support 324.

Figure 9:
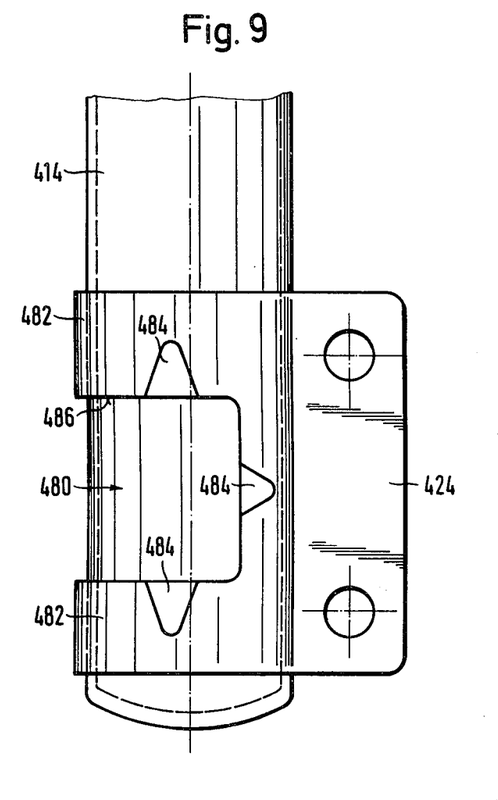
FIG. 9 is a lateral view of another embodiment of the invention wherein a steering knuckle support is provided with a recess.

FIG. 9 depicts a further embodiment of the invention wherein in order to accomplish weight reduction, the steering knuckle support 424 is furnished with a recess 480 whereby an upper and a lower bracket are formed. For establishing a connection which is free of play and rotatably fixed between the steering knuckle support 424 and the pipe jacket 414, the inwardly directed projections 484 and corresponding indentations in the pipe jacket 414 are formed in the region in which the edges of the steering knuckle support 424 border the recess 480.

Shock absorbers built differently from the piston-and-cylinder type described may also be utilized instead of the dual pipe shock absorber. In fastening a fitting element on a cylindrical pipe of a single pipe shock absorber, care must be taken that if a damping piston is present, the indentations which project into the interior of the cylinder will not prevent movement of the damping piston.

While specific embodiments of the invention have been shown and described in detail to illustrate the application of the inventive principles, it will be understood that the invention may be embodied otherwise without departing from such principles.

What is claimed is:

1. A vibration damper assembly comprising a vibration damping mechanism formed with a piston-and-cylinder construction having an axis and including a coaxially extending cylindrical pipe jacket, at least one fitting element embracing said pipe jacket, said pipe jacket including at least one radially inwardly directed indentation extending only over part of the circumference of said pipe jacket and being spaced apart from both axial ends of said jacket tube, said fitting being formed wtih at least one projection corresponding with said at least one indentation, said projection engaging into said corresponding indentation of said pipe jacket whereby said fitting element is essentially rigidly affixed to said pipe jacket, wherein the region of said pipe jacket defined by said indentation has a contour length 2 L extending in the circumferential direction of said pipe jacket, said contour length 2 L corresponding to a contour length 2 B of said region before deformation thereof to form said indentation without essential elongation of said region in the circumferential direction.

2. An assembly according to claim 1 wherein said projection and said indentation are formed simultaneously by a corresponding shaping operation with said fitting element arranged on said pipe jacket.

3. An assembly according to claim 2 wherein said projection and said indentation are formed by a stamping operation.

4. An assembly according to claim 1 wherein said fitting element has arranged thereon a plurality of said projections distributed over the circumference thereof and directed radially inwardly, said pipe jacket being formed with corresponding indentations arranged to be engaged by each of said projections.

5. An assembly according to claim 4 wherein said projections of said fitting element are arranged along at least one edge of said fitting element, said projections being configured to extend radially inwardly of said vibration damper assembly with an increasing inwardly directed orientation, with said indentations being formed to define radially extending contact surfaces against which the edges of said projections are longitudinally braced.

6. An assembly according to claim 5 wherein said projections are arranged to extend forwardly of said fitting element taken in the direction in which stress is applied against said fitting element relative to said pipe jacket.

7. An assembly according to claim 6 wherein said edges of said projections which abut against said contact surfaces of said indentations are formed at the forwardmost end of said fitting element taken in the direction of stress application thereto.

8. An assembly according to claim 4 wherein said fitting element is formed with circumferential edges on opposite ends thereof and wherein said projections of said fitting element and corresponding indentations of said pipe jacket are arranged in the areas of both circumferential edges of said fitting element.

9. An assembly according to claim 4 wherein said fitting element is formed with circumferential edges on opposite ends thereof and wherein said projections on said fitting element and said corresponding indentations in said pipe jacket are arranged spaced away from both said circumferential edges of said fitting element.

10. An assembly according to claim 1 wherein said pipe jacket is configured with a preformed shoulder for contacting with said fitting element.

11. An assembly according to claim 1 wherein said fitting element is constructed with radially inwardly directed stop members engaging said pipe jacket to prevent relative longitudinal movement therebetween in one direction.

12. An assembly according to claim 1 having a longitudinal axis wherein said fitting element is provided with at least one recess located at the mid-portion of the length thereof taken in a direction parallel to said damper axis.

13. An assembly according to claim 12 wherein said recess of said fitting element extends over a substantial Part of the circumference thereof and forms a pair of annular brackets.

14. An assembly according to claim 12 or 13 wherein said recess is configured to form edges on said fitting element and wherein said radially inwardly directed projections are arranged on said edges of said fitting element formed by said recess.

15. An assembly according to claim 1 wherein said fitting element comprises a spring retainer which is configured to embrace said pipe jacket with an annular attachment member.

16. An assembly according to claim 1 wherein said fitting element comprises a one-piece steering knuckle.

17. An assembly according to claim 16 wherein said fitting element is constructed in the form of a pipe clamping element connecting said pipe jacket and said steering knuckle.

18. An assembly according to claim 1 wherein said vibration damping mechanism is formed as a dual pipe shock absorber including an outer pipe and wherein said outer pipe comprises said pipe jacket of said assembly.

* * * * *